United States Patent [19]
Nachbur et al.

[11] 3,887,553
[45] June 3, 1975

[54] PROCESS FOR THE MANUFACTURE OF PHOSPHORUS-CONTAINING CONDENSATION PRODUCTS

[75] Inventors: Hermann Nachbur, Dornach; Arthur Maeder, Therwil, both of Switzerland

[73] Assignee: Ciba-Geigy AG, Basle, Switzerland

[22] Filed: Aug. 31, 1972

[21] Appl. No.: 285,383

[30] Foreign Application Priority Data
Jan. 14, 1972  Switzerland............... 521/72

[52] U.S. Cl. ....... 260/249.6; 260/249.5; 260/249.8; 260/249.9; 252/8.8; 117/136
[51] Int. Cl. ........................................... C07d 55/24
[58] Field of Search........... 260/249.5, 249.6, 249.8, 260/249.9

[56] References Cited
UNITED STATES PATENTS

| | | | |
|---|---|---|---|
| 2,668,096 | 2/1954 | Reeves et al. | 8/115.5 |
| 2,772,188 | 11/1956 | Reeves et al. | 117/136 |
| 2,809,941 | 10/1957 | Reeves et al. | 260/2 |
| 2,911,322 | 11/1959 | Klein et al. | 117/76 |
| 2,983,623 | 5/1961 | Coates | 117/62 |
| 2,993,746 | 7/1961 | Miles et al. | 8/116 |
| 3,421,923 | 1/1969 | Guth et al. | 117/62.2 |
| 3,551,422 | 12/1970 | Tesoro et al. | 260/249.8 |
| 3,634,422 | 1/1972 | Nachbur et al. | 260/249.8 X |
| 3,654,274 | 4/1972 | Chance et al. | 260/249.8 |

FOREIGN PATENTS OR APPLICATIONS

| | | |
|---|---|---|
| 784,318 | 10/1957 | United Kingdom |
| 805,499 | 12/1958 | United Kingdom |
| 800,157 | 8/1958 | United Kingdom |
| 938,990 | 10/1963 | United Kingdom |
| 378,277 | 7/1964 | Switzerland |
| 1,294,340 | 5/1969 | Germany |
| 1,045,655 | 12/1958 | Germany |
| 1,221,605 | 7/1966 | Germany |
| 1,419,474 | 10/1969 | Germany |
| 1,419,477 | 2/1970 | Germany |
| 1,419,478 | 10/1962 | Germany |
| 740,269 | 11/1955 | United Kingdom |
| 761,985 | 11/1956 | United Kingdom |
| 882,993 | 11/1961 | United Kingdom |
| 884,785 | 12/1961 | United Kingdom |
| 1,126,432 | 9/1968 | United Kingdom |
| 1,280,804 | 11/1961 | France |

OTHER PUBLICATIONS
Guthrie et al., American Dyestuff Reporter, Vol. 44, pp. 328–332, (1955).

*Primary Examiner*—John M. Ford
*Attorney, Agent, or Firm*—Joseph G. Kolodny; Prabodh I. Almaula; Edward McC. Roberts

[57] ABSTRACT

The subject of the invention is a process for the manufacture of water-soluble condensation products of hydroxymethylphosphonium compounds and a 1,3,5-triazine characterised in that (a) 1 mol of a tetrakis-(hydroxymethyl)-phosphonium compound is condensed with (b) 0.02 to 0.1 mol, preferably 0.05 to 0.1 mol of optionally methylolated 1,3,5-triazine which is substituted by at least one primary amino group, at 40° to 120°C, optionally in the presence of formaldehyde or a formaldehyde-releasing agent and optionally in the presence of an inert organic solvent, the condensation is optionally thereafter continued at temperatures of 100° to 150°C and, if appropriate, free hydroxyl groups are etherified at least partially with at least one alkanol with 1 to 4 carbon atoms and, if appropriate, the salts of the condensation products are converted into the corresponding hydroxides.

The condensation products are used for flameproofing organic fibre material, especially textiles.

10 Claims, No Drawings

PROCESS FOR THE MANUFACTURE OF PHOSPHORUS-CONTAINING CONDENSATION PRODUCTS

The subject of the invention is a process for the manufacture of water-soluble condensation products of hydroxymethylphosphonium compounds and a 1,3,5-triazine characterised in that (a) 1 mol of a tetrakis-(hydroxymethyl)-phosphonium compound is condensed with (b) 0.02 to 0.1 mol, preferably 0.05 to 0.1 mol. of optionally methlolated 1,3,5-triazine which is substituted by at least one primary amino group, at 40° to 120°C, optionally in the presence of formaldehyde or a formaldehyde-releasing agent and optionally in the presence of an inert organic solvent, the condensation is optionally thereafter continued at temperatures of 100° to 150°C and, if appropriate, free hydroxyl groups are etherified at least partially with at least one alkanol with 1 to 4 carbon atoms and, if appropriate, the salts of the condensation products are converted into the corresponding hydroxides.

The condensation is preferably carried out at 70° to 110°C in an inert organic solvent or solvent mixture. For this, aromatic hydrocarbons are above all suitable, such as, for examle, toluene, o-, m- or p-xylene or a mixture thereof, or also xylene-toluene, xylene-benzene or xylene-decahydronaphthalene mixtures. Preferably, the optional subsequent further condensation is carried out at 125° to 140°C or, in particular, at about 135°C, that is to say the boiling point of the solvent or solvent mixture.

At the same time it is however also possible to carry out the condensation in the absence of an inert organic solvent, for example by using already prepared condensation product as the solvent or by carrying out the condensation in the melt.

An appropriate procedure is to heat the tetrakis-(hydroxymethyl)-phosphonium compound, which as a rule is in the form of an aqueous solution, together with the component (b), optionally in a solvent, to the boil and to distil off the water.

Possible tetrakis-(hydroxymethyl)-phosphonium compounds are above all salts and the hydroxide.

Suitable tetrakis-(hydroxymethyl)-phosphonium salts are, for example, the formate, acetate, phosphate or sulphate and the halides, such as, for example, the bromide or especially the chloride. Tetrakis-(hydroxymethyl)-phosphonium chloride is hereafter referred to as THPC.

Where the tetrakis-(hydroxymethyl)-phosphonium hydroxide (THPOH) is used as the starting product, it is appropriately manufactured beforehand from a corresponding salt, for example THPC, by neutralisation, preferably at a pH value of 7 to 7.5, in aqueous solution, with a base, for example sodium hydroxide, followed by dehydration.

Component (b) is preferably an optionally methylolated compound of the formula (1)

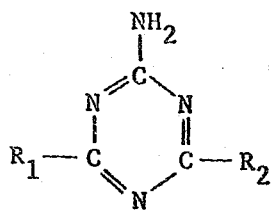

wherein $R_1$ denotes amino, hydroxyl or hydrogen and $R_2$ denotes amino, hydroxyl, hydrogen, methyl, phenyl or 1-dialkylphosphono-(alkyl)$_{n-1}$, in which $n$ is 1 or 2.

The 1-dialkylphosphono-(alkyl)$_{n-1}$ radical is preferably a group of the formula (2)

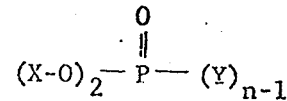

wherein X is lower alkyl, Y is lower alkylene and $n$ is 1 or 2. Lower alkyl and lower alkylene contain as a rule at most 6 carbon atoms, such as, for example, methyl, ethyl, n-propyl, isopropyl, tert. butyl, n-hexyl or methylene, ethylene, ethylidene, propylidene, n-propylene, n-butylene or n-hexylene. Methyl or ethyl and methylene or ethylene are preferred. $n$ is preferably 2.

1,3,5-Triazines containing radicals of the formula (2) are known, for example from U.S. Patent specification No. 3,551,422.

Here optionally methylolated 1,3,5-triazines of the formula (3)

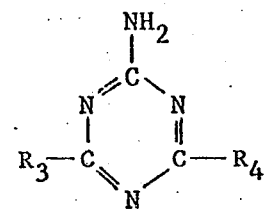

wherein $R_3$ denotes amino or hydroxyl and $R_4$ denotes amino, hydroxyl, hydrogen or 1-diethylphosphono-ethyl, are of special interest.

Thus, possible components(b) are, for example, ammeline, ammelide, formoguanamine, acetoguanamine, benzoguanamine, acetoguanide or preferably 1-diethylphosphonoethyl-3,5-diaminotriazine and especially melamine, with these 1,3,5-triazones being in the methylolated or preferably the unmethylolated form.

The formaldehyde which is optionally used conjointly during the manufacture of the phosphorus-containing condensation products is preferably in the form of an aqueous solution. A possible formaldehyde-releasing agent is above all paraformaldehyde.

The etherification, which is optionally to be carried out, of the condensation product which still contains free hydroxyl groups is effected with, for example, n-butanol, n-propanol, ethanol or especially methanol. Preferably, this is done in an acid medium.

The acid catalysts optionally used conjointly in the condensation are preferably acid salts (Lewis acids) such as magnesium chloride, iron-III chloride, zinc nitrate or boron trifluoride/diethyl ether. The conjoint use of these catalysts is particularly advisable in the case of the condensation with THPOH.

After completion of condensation and, if appropriate, etherification, the salts of the condensation products can also be completely or partially converted into their corresponding hydroxides, which as a rule is achieved by adding strong bases, such as alkali metal hydroxides or alkaline earth metal hydroxides, for example sodium hydroxide, potassium hydroxide or calcium hydroxide, and also sodium carbonate. The amount of base is appropriately so chosen that the pH value of the reaction mixture is about 5 to 8. This conversion is appropriately effected in the application bath.

At times, the end products have an unpleasant odour caused by volatile low molecular trivalent phosphorus compounds, for example phosphinees, such as trihydroxymethylphosphine. This odour can be eliminated by an oxidative after-treatment of the condensation product, for example by passing air or oxygen into the reaction mixture or by adding oxidising agents, such as hydrogen peroxide or potassium persulphate.

The condensation products are used for flameproofing organic fibre material, especially textiles. An appropriate procedure for this is to treat these materials with an aqueous preparation which contains at least 1) a condensation product of the indicated nature and 2) a polyfunctional compound which differs from the condensation products according to 1), and to finish the materials treated in this way by the wet batch process, moist batch process or especially the ammonia fixing process or above all by the thermofixing process.

The component 2) preferably consists of polyfunctional epoxides or above all of polyfunctional nitrogen compounds. Possible epoxides are above all epoxides which are liquid at room temperature and have at least two epoxide groups which are preferably derived from polyhydric phenols. Polyfunctional nitrogen compounds are, for example, polyalkylenepolyamines or, in particular, aminoplast-forming agents or aminoplast precondensates. The latter are preferred.

By aminoplast-forming agents there are understood nitrogen compounds which can be methylolated, and by aminoplast precondensates there are understood addition products of formaldehyde to nitrogen compounds which can be methylolated. As aminoplast-forming agents or nitrogen compounds which can be methylolated, there may be mentioned: 1,3,5-aminotriazines such as N-substituted melamines, for example N-butylmelamine, N-trihalogenomethylmelamines, triazones, and also ammeline, guanamines, for example benzoguanamines or acetoguanamines, or also diguanamines.

Further possibilities are: cyanamide, acrylamide, alkylurea or arylurea and alkylthioureas or arylthioureas, alkyleneureas or alkylenediureas, for example urea, thiourea, urones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the —CH$_2$CH$_2$CO—NH—CH$_2$OH radical. The methylol compounds of a urea, of an ethyleneurea or especially of melamine are preferentially used. Valuable products are provided in general by products which are as highly methylolated as possible, but in particular also by products with low methylolation. Etherified or non-etherified methylolmelamines, such as dimethylolmelamine or trimethylolmelamine or mixtures thereof, are especially suitable. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol, ispropanol, n-butanol or pentanols, are of advantage. It is however desirable that these aminoplast precondensates should be water-soluble, such as, for example, the pentamethylolmelamine-dimethyl-ether or trimethylolmelamine-dimethyl-ether.

The organic fibre materials to be provided with a flameproof finish are, for example, wood, paper, furs, hides or, preferably, textiles. In particular, fibre materials of polyamides, cellulose, cellulose-polyester or polyester are flameproofed, with fabrics of wool, polyester or above all mixed fabrics of polyester-cellulose, wherein the ratio of the polyester constituent to the cellulose constituent is 1:4 to 2:1, being preferred. Thus, for example, so-called 20/80, 26/74, 50/50 or 67/33 polyester-cellulose mixed fabrics can be used.

The cellulose or the cellulose constituent of the fibre material originates, for example, from linen, cotton, rayon or staple viscose. In addition to polyester-cellulose fibre mixtures it is also possible to use fibre mixtures of cellulose with natural or synthetic polyamides. Above all, fibre materials of wool can also be flameproofed well with the poly-condensation products.

The aqueous preparations for flameproofing the organic fibre materials as a rule contain 200 to 600 g/l, preferably 350 to 500 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of material on fabrics it is advantageous, for example, to add 0.1 to 0.5 percent of a high molecular polyethylene glycol. Further, the customary plasticisers, for example an aqueous polyethylene emulsion or silicone oil emulsion, can be added to the preparations. Further, the preparations can also contain surface-active agents, such as p-tert.-nonylphenol-ethylene oxide adducts.

To improve the mechanical strengths of the fibres, suitable copolymers can also be added to the preparations, for example copolymers of N-methylolacrylamide or cationic copolymers. For example, aqueous emulsions of copolymers of (a) 0.25 to 10 percent of an alkaline earth metal salt of an $\alpha,\beta$-ethylenically unsaturated monocarboxylic acid, (b) 0.25 to 30 percent of a N-methylolamide or N-methylolamide-ether of an $\alpha,\beta$-ethylenically unsaturated monocarboxylic or dicarboxylic acid and (c) 99.5 to 60 percent of at least one other copolymerisable compound are advantageous in this context. These copolymers and their manufacture are known. The tenacity and abrasion resistance of the treated fibre material can be favourably influenced by the conjoint use of such a copolymer.

If a polymer of the indicated type is further added to the preparation, the amounts are advantageously small, for example 1 to 10 percent, relative to the amount of the condensation product. The same is true of any plasticiser, where the appropriate amounts can again be 1 to 10 percent.

It is also possible, though in most cases not necessary, to add curing catalysts such as, for example, ammonium chloride, ammonium dihydrogen orthophosphate, phosphoric acid, magnesium chloride or zinc nitrate.

The pH value of the preparations is as a rule 2 to 7.5, preferably 4 to 7, and is adjusted in the usual manner by adding acid or base.

It can also be advantageous to add buffer substances, for example NaHCO$_3$, disodium phosphate and trisodium phosphate and triethanolamine.

To improve the durability of the flameproof finishes and to achieve a soft handle, it can be advantageous to add to the aqueous preparations halogenated paraffins in combination with a polyvinyl halide compound.

The preparations are now applied to the fibre materials, and this can be done in a manner which is in itself known. Preferably, piece goods are used and impregnated on a padder which is charged with the preparation at room temperature.

In the preferred thermofixing process, the fibre material impregnated in this way must now be dried and subjected to a heat treatment. It is appropriately dried at temperatures of up to 100°C. Thereafter the material is subjected to a heat treatment at temperatures above 100°C, for example 100° to 200°C, preferably 120° to 180°C, the duration of which can be the shorter, the higher is the temperature. This duration of heating, is, for example, 30 seconds to 10 minutes.

It is, furthermore, also possible to use the so-called ammonia fixing process, the moist fixing process or the wet fixing process.

If the moist fixing process is used, the fabric is first dried to a residual moisture content of about 5 to 20 percent and then batched for 12 to 48 hours at about 40° to 60°c, rinsed, washed and dried. In the wet fixing process, a similar procedure is followed except that the completely wet fibre material is batched. In the ammonia fixing process, the treated fibre material is first, in the moist state, gassed with ammonia and is subsequently dried.

A rinse with an acid-binding agent, preferably with aqueous sodium carbonate solution, can be desirable in the case of a strongly acid reaction medium.

The percentages and parts in the examples which follow are percentages by weight or parts by weight. The relationship of parts by volume to parts by weight is as of ml to g.

EXAMPLE 1

244 parts of a 78 percent strength aqueous THPC solution (1 mol), 12.6 parts of melamine (0.1 mol) and 200 parts of a xylene isomer mixture are heated to the boil, with rapid stirring, in a stirred vessel of 500 parts by volume capacity which is equipped with a water separator and thermometer. The azeotropic removal of the water from the aqueous THPC solution commences at a boiling point of 103°C. After removal of this water (53.5 parts) the boiling point of the xylene is 130°c. A further 9.5 parts of water are now removed azeotropically by additional treatment at this temperature, after which the condensation product forms a highly viscous mass. It is cooled to 95°C, the product is dissolved by adding 200 parts of water and the xylene is largely siphoned off. The aqueous solution is evaporated in vacuo at 60°C.

185 parts of a very highly viscous product containing 100 percent of active substance are obtained. The infra-red spectrum of this product shows the following bands:

| Broad | band at approx. | 3,300 cm$^{-1}$ | strong |
|---|---|---|---|
| Broad | do. | 2,920 do. | weak |
| Broad shoulder | do. | 2,850 do. | medium |
| Broad shoulder | do. | 2,640 do. | medium |
| Broad shoulder | do. | 2,480 do. | weak |
| Broad shoulder | do. | 2,370 do. | weak |
| Broad | do. | 2,080 do. | weak-medium |
| Broad shoulder | do. | 1,710 do. | medium |
| Broad | do. | 1,625 do. | medium-strong |
| Broad | do. | 1,545 do. | weak-medium |
| Broad shoulder | do. | 1,470 do. | weak-medium |
| Broad shoulder | do. | 1,410 do. | weak |
| Broad shoulder | do. | 1,390 do. | medium |
| Broad | do. | 1,300 do. | weak-medium |
| Broad shoulder | do. | 1,255 do. | weak |
| Broad shoulder | do. | 1,200 do. | weak |
| Broad shoulder | do. | 1,165 do. | weak |
| Broad shoulder | do. | 1,110 do. | weak |
| Broad | do. | 1,040 do. | medium-strong |
| Broad shoulder | do. | 910 do. | medium |
| Broad shoulder | do. | 880 do. | weak |
| Sharp | do. | 805 do. | weak |

EXAMPLE 2

244 parts of a 78 percent strength aqueous solution of THPC (1 mol) in 12.6 parts (0.1 mol) of melamine are treated for 2 hours at 100°C internal temperature in a stirred vessel of 500 parts by volume capacity which is equipped with a thermometer and reflux condenser. Thereafter the mixture is cooled to room temperature and approximately 1 part of insoluble matter is filtered off.

255 parts of a reddish-coloured low-viscosity solution containing 77 percent of active substance are obtained. The infra-red spectrum of this product shows the following bands:

| Broad | band at approx. | 3,240 cm$^{-1}$ | strong |
|---|---|---|---|
| Broad | do. | 2,920 do. | weak |
| Broad shoulder | do. | 2,850 do. | medium |
| Broad shoulder | do. | 2,630 do. | medium |
| Broad shoulder | do. | 2,470 do. | weak |
| Broad shoulder | do. | 2,360 do. | weak |
| Sharp | do. | 2,080 do. | medium |
| Broad shoulder | do. | 1,710 do. | medium |
| Broad shoulder | do. | 1,620 do. | medium-strong |
| Broad | do. | 1,555 do. | weak-medium |
| Broad shoulder | do. | 1,480 do. | weak |
| Broad | do. | 1,400 do. | weak-medium |
| Broad | do. | 1,295 do. | weak |
| Broad | do. | 1,200 do. | weak-medium |
| Broad shoulder | do. | 1,105 do. | weak |
| Broad | do. | 1,040 do. | medium-strong |
| Broad shoulder | do. | 910 do. | medium-strong |
| Broad shoulder | do. | 880 do. | weak |
| Sharp | do. | 810 do. | weak |

EXAMPLE 3

97.6 parts of a 78 percent strength aqueous solution of THPC (0.4 mol) and 11 parts (0.04 mol) of a compound of the formula (4)

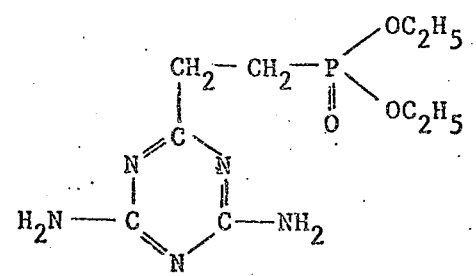

are treated for 2 hours at 100° to 110°C internal temperature in a stirred vessel of 200 parts by volume capacity which is equipped with a thermometer and reflux condenser. Thereafter the mixture is cooled to room temperature. 107.5 parts of a pink-coloured low-viscosity solution containing 80 percent of active substance are obtained. The infra-red spectrum of this product shows the following bands:

| Broad | band at approx. | 3,240 cm$^{-1}$ | strong |
|---|---|---|---|
| Sharp | do. | 2,920 do. | weak |
| Broad shoulder | do. | 2,880 do. | medium |
| Broad shoulder | do. | 2,660 do. | weak-medium |
| Broad shoulder | do. | 2,480 do. | weak |
| Broad shoulder | do. | 2,370 do. | weak |
| Broad | do. | 2,080 do. | weak |
| Broad shoulder | do. | 1,730 do. | weak |
| Broad | do. | 1,635 do. | medium-strong |
| Broad | do. | 1,560 do. | weak-medium |
| Broad shoulder | do. | 1,480 do. | weak |
| Broad | do. | 1,420 do. | medium |
| Broad | do. | 1,300 do. | weak |
| Broad | do. | 1,205 do. | weak |
| Broad shoulder | do. | 1,110 do. | weak |
| Sharp | do. | 1,050 do. | medium-strong |
| Broad shoulder | do. | 980 do. | weak |
| Broad shoulder | do. | 920 do. | medium |
| Broad shoulder | do. | 885 do. | weak |
| Broad | do. | 815 do. | weak |

EXAMPLE 4

190.5 parts of crystalline anhydrous THPC (1 mol) and 2.52 parts of melamine (0.02 mol) are condensed for 2 hours in the melt at 105°–120°C, in a stirred vessel of 500 parts by volume capacity which is equipped with a reflux condenser and thermometer. Thereafter the mixture is cooled to 50°C, 80 parts of methanol and 0.1 part of 37 percent strength aqueous HCl are added and the mixture is etherified for 30 minutes at the reflux temperature (approx. 65°C). The excess methanol is subsequently removed in vacuo. 174 parts of a reddish-coloured crystalline product are obtained. The phosphorus content is 17.8 percent. The infrared spectrum of this product shows the following bands:

| Broad | band at approx. | 3,260 cm$^{-1}$ | strong |
|---|---|---|---|
| Sharp | do. | 2,935 do. | weak |
| Broad shoulder | do. | 2,860 do. | medium |
| Broad shoulder | do. | 2,660 do. | medium |
| Broad shoulder | do. | 2,460 do. | weak |
| Broad shoulder | do. | 2,360 do. | weak |
| Broad | do. | 2,080 do. | weak-medium |
| Broad shoulder | do. | 1,710 do. | weak |
| Broad | do. | 1,635 do. | medium-strong |
| Broad | do. | 1,555 do. | weak |
| Sharp shoulder | do. | 1,470 do. | weak-medium |
| Broad | do. | 1,420 do. | medium |
| Broad | do. | 1,300 do. | weak |
| Broad shoulder | do. | 1,270 do. | weak |
| Broad | do. | 1,200 do. | weak |
| Sharp shoulder | do. | 1,170 do. | weak |
| Broad shoulder | do. | 1,115 do. | weak |
| Sharp | do. | 1,050 do. | strong |
| Sharp shoulder | do. | 920 do. | medium-strong |
| Broad shoulder | do. | 895 do. | weak-medium |
| Broad | do. | 815 do. | weak |

EXAMPLE 5

244 parts of a 78 percent strength aqueous THPC solution (1 mol), 12.5 parts of acetoguanamine (0.1 mol) and 17 parts of a 35.4 percent strength aqueous formaldehyde solution (0.2 mol) are condensed for 2 hours at 100°–110°C in a stirred vessel of 500 parts by volume capacity which is equipped with a reflux condenser and thermometer. After cooling, 268 parts of a reddish-coloured mobile solution of the condensation product are obtained. The phosphorus content is 11.6 percent. The infra-red spectrum of this product shows the following bands:

| Broad | band at approx. | 3,240 cm$^{-1}$ | strong |
|---|---|---|---|
| Sharp | do. | 2,910 do. | weak |
| Broad shoulder | do. | 2,850 do. | medium |
| Broad shoulder | do. | 2,680 do. | medium |
| Broad shoulder | do. | 2,470 do. | weak |
| Broad shoulder | do. | 2,350 do. | weak |
| Broad | do. | 2,070 do. | weak-medium |
| Broad shoulder | do. | 1,705 do. | weak |
| Broad | do. | 1,630 do. | medium-strong |
| Broad | do. | 1,550 do. | medium |
| Broad shoulder | do. | 1,475 do. | weak |
| Broad | do. | 1,410 do. | medium |
| Broad | do. | 1,295 do. | weak |
| Broad | do. | 1,200 do. | weak-medium |
| Broad shoulder | do. | 1,105 do. | weak |
| Broad | do. | 1,040 do. | medium-strong |
| Sharp shoulder | do. | 920 do. | medium |
| Broad shoulder | do. | 880 do. | weak-medium |
| Sharp | do. | 805 do. | weak |

EXAMPLE 6

244 parts of a 78 percent strength aqueous THPC solution (1 mol) are cooled to 10°C in a stirred vessel of 500 parts by volume capacity which is equipped with a reflux condenser and thermometer, and are neutralised to $p_H$ 7.2 by slow addition of 54.6 parts of 30 percent strength aqueous NaOH, with rapid stirring. Thereafter 21.6 parts (0.1 mol) of trimethylolmelamine are added and the mixture is condensed for 2 hours at 100°–105°C. After cooling, 317 parts of a colourless, low-viscosity solution of the condensation product are obtained. The phosphorus content is 9.8 percent. The infra-red spectrum of this product shows the following bands:

| Broad | band at approx. | 3,300 cm$^{-1}$ | strong |
|---|---|---|---|
| Broad | do. | 2,920 do. | weak |
| Broad shoulder | do. | 2,860 do. | medium |
| Broad shoulder | do. | 2,640 do. | weak-medium |
| Broad shoulder | do. | 2,450 do. | weak |
| Broad shoulder | do. | 2,370 do. | weak |
| Broad | do. | 2,080 do. | weak |
| Broad shoulder | do. | 1,710 do. | weak |
| Broad | do. | 1,630 do. | medium |
| Broad | do. | 1,535 do. | medium |
| Broad | do. | 1,475 do. | weak |
| Broad shoulder | do. | 1,400 do. | weak-medium |
| Broad shoulder | do. | 1,320 do. | weak |
| Broad shoulder | do. | 1,290 do. | weak |
| Broad | do. | 1,250 do. | weak |
| Broad | do. | 1,205 do. | weak |
| Broad shoulder | do. | 1,165 do. | weak |
| Broad shoulder | do. | 1,110 do. | weak |
| Broad | do. | 1,040 do. | medium |
| Broad shoulder | do. | 910 do. | medium |
| Broad shoulder | do. | 880 do. | medium |
| Sharp | do. | 810 do. | weak |

EXAMPLE 7

244 parts of a 78 percent strength aqueous THPC solution (1 mol) and 6.3 parets of melamine (0.05 mol) are condensed for 2 hours at 95°–110°C in a stirred vessel of 500 parts by volume capacity which is equipped with a reflux condenser and thermometer. Thereafter the water is removed in vacuo at 60°C. 168 parts of a white crystalline product are obtained. The phosphorus content is 18.4 percent. The infrared spectrum of this product shows the following bands:

| Broad | band at approx. | 3,260 cm$^{-1}$ | strong |
|---|---|---|---|
| Sharp | do. | 2,910 do. | weak |

-Continued

| | | | |
|---|---|---|---|
| Broad shoulder | do. | 2,850 do. | medium |
| Broad shoulder | do. | 2,650 do. | weak-medium |
| Broad shoulder | do. | 2,450 do. | weak |
| Broad shoulder | do. | 2,360 do. | weak |
| Broad | do. | 2,070 do. | weak |
| Broad shoulder | do. | 1,705 do. | weak |
| Broad | do. | 1,630 do. | medium-strong |
| Broad | do. | 1,550 do. | weak-medium |
| Broad shoulder | do. | 1,470 do. | weak |
| Broad | do. | 1,410 do. | medium |
| Broad | do. | 1,295 do. | weak |
| Broad | do. | 1,195 do. | weak-medium |
| Broad shoulder | do. | 1,105 do. | weak |
| Sharp | do. | 1,040 do. | strong |
| Sharp shoulder | do. | 910 do. | medium-strong |
| Broad shoulder | do. | 880 do. | weak-medium |
| Sharp | do. | 805 do. | weak |

The degree of fixing indicates the amount of product present on the fibre after rinsing (relative to the amount originally taken up).

The fabrics are then washed up to 20 times or up to 40 times for 45 minutes at 60°C in a domestic washing machine, using a liquor which contains 4 g/l of a domestic detergent (SNV 198,861 wash).

The individual fabric samples are then tested for their flameproof character (DIN 53,096 vertical test; ignition time 6 seconds). Untreated fabric burns away. The results are summarised in Table 1 below.

EXAMPLE 9

A mixed fabric of polyester/cotton (PES/CO), 67:33 and 50:50, and fabrics of wool and of cotton are treated Table 1

| Constituents and Conditions | | Treated with Liquor PES/CO | | | | | |
|---|---|---|---|---|---|---|---|
| | | 50:50 | | | 67:33 | | |
| | | A | B | C | D | E | F |
| Product according to Example 1, | g/l | 400 | | | 400 | | |
| Product according to Example 2, | g/l | | 575 | | | 575 | |
| Product according to Example 3, | g/l | | | 600 | | | 600 |
| Dimethylolmelamine | g/l | 96.5 | 96.5 | 80.5 | 96.5 | 96.5 | 80.5 |
| Dispersing agent* | g/l | | | 80.5 | | | 80.5 |
| pH-Value of the liquor (adjusted with NaOH) | | 5.8 | 5.6 | 5.8 | 5.8 | 5.6 | 5.8 |
| g of Phosphorus per kg of Fabric | | 52 | 52 | 57 | 52 | 52 | 57 |
| Liquor uptake, % | | 75 | 75 | 75 | 75 | 75 | 75 |
| Degree of fixing, % | | 63 | 60 | 70 | 62 | 62 | 70 |
| Flameproof Character | | | | | | | |
| smouldering time (seconds) | | 0 | 0 | 0 | 0 | 0 | 1.5 |
| tear length (cm) | | 9.5 | 9.5 | 11.5 | 9.5 | 9.5 | 11.5 |
| After 20 washes | | | | | | | |
| smouldering time (seconds) | | 0 | 0 | 0 | 0 | 0 | 0 |
| tear length (cm) | | 7 | 10 | 10 | 9 | 9 | 9.5 |
| After 40 washes | | | | | | | |
| smouldering time (seconds) | | 0 | 0 | 0 | 0 | — | — |
| tear length (cm) | | 7.5 | 9 | 10 | 8.5 | — | — |

\* Condensation product of 1 mol of p-tert.-nonylphenol and 9 mols of ethylene oxide.

EXAMPLE 8

Mixed fabrics of polyester/cotton (PES/CO), (67/33) and (50/50), are padded with the liquors according to Table 1 below, dried for 30 minutes at about 80°C and subsequently cured for 5 minutes at 150°C.

The fabric is then washed for 5 minutes at 60°C in a liquor which per litre contains 5 ml of hydrogen peroxide (35 percent strength), 3 g of aqueous sodium hydroxide solution (30 percent strength) and 1 g of a 25 percent strength aqueous solution of a condensation product of 1 mol of p-tert.-nonylphenol and 9 mols of ethylene oxide. Thereafter the fabric is rinsed and dried.

with the liquors according to Table 2 below, in the manner indicated in Example 8.

The PES/CO fabrics are rinsed as indicated in Example 8 and subjected to up to 20 washes. The wool fabric or cotton fabric is washed in a bath which contains 4 g/l of sodium carbonate and 1 g/l of a condensation product of 1 mol of p-tert.-nonylphenol and 9 mols of ethylene oxide, for 5 minutes at 40°C or 95°C, respectively. The subsequent wash according to SNV 198,861 is also carried out at 40°C or 95°C, respectively.

The individual pieces of fabric are then tested for their flameproof character (DIN 53,096 vertical test, 6 seconds ignition time). Untreated fabrics burn away. The results of this test are also summarised in Table 2.

Table 2

| Constituents g/l | Treated with | | | | | | | | | | | |
|---|---|---|---|---|---|---|---|---|---|---|---|---|
| | PES/CO 50:50 | | | | | | PES/CO 67:33 | | | | W | CO |
| | A | B | C | D | E | F | G | H | I | J | K | L | M |
| Product according to Example | | | | | | | | | | | | |
| 4 | 460 | 460 | | | | | 460 | 460 | | | | |
| 5 | | | 705 | 705 | | | | | 705 | 705 | | |
| 6 | | | | | 835 | | | | | | 835 | 685 | 450 |
| 7 | | | | | | 445 | | | | | | |
| Di-Trimethylolmelamine | 103 | | 103 | 103 | 103 | 103 | 103 | | 103 | 103 | 103 | 845 | 120 |
| Trimethylolmelamine-dimethyl-ether (75% strength) | | 153 | | | | | | 153 | | | | | |

Table 2 – Continued

| Constituents g/l | Treated with | | | | | | | | | | | | |
|---|---|---|---|---|---|---|---|---|---|---|---|---|---|
| | PES/CO 50:50 | | | | | | PES/CO 67:33 | | | | | W | CO |
| | A | B | C | D | E | F | G | H | I | J | K | L | M |
| Condensation product * | | | | | | | | | | | | | 2 |
| Silicon oil emulsion (40% strength) | 35 | 35 | 35 | 35 | 35 | 35 | 35 | 35 | 35 | 35 | 35 | 35 | |
| pH-Value of the liquor | 5.5 | 5.5 | 4.5 | 6.5** | 7** | 5.5 | 5.5 | 5.5 | 4.5 | 6.5** | 7** | 7** | 7** |
| Degree of fixing, % | 63 | 64 | 68 | 63 | 71 | 84 | 61 | 61 | 61 | 64 | 76 | 63 | 63 |
| g of Phosphorus per kg of Fabric | 57 | 57 | 57 | 57 | 57 | 57 | 57 | 57 | 57 | 57 | 57 | 54 | 35 |

Flameproof Character: burning time (seconds) / tear length (cm)

| | A | B | C | D | E | F | G | H | I | J | K | L | M |
|---|---|---|---|---|---|---|---|---|---|---|---|---|---|
| After rinsing | 2/9.5 | 3/10 | 1/10.5 | 1/9.5 | 1/11 | 1/10 | 8/12.5 | 4/10.5 | 3/10 | 2/13.5 | 2/11.5 | 8/10 | 0/6 |
| After 1 wash | 1/11 | 1/12 | 1/9 | 1/8.5 | 1/11 | 0/8.5 | 2/10.5 | 1/10.5 | 2/10.5 | 2/10 | 1/10 | 5/6.5 | 0/6.5 |
| After 5 washes | 2/13 | 1/8 | 1/9 | 1/10.5 | 1/9.5 | 1/9 | 1/11 | 2/11 | 1/11 | 3/10 | 1/9 | 0/14 | 0/9.5 |
| After 20 washes | 2/8 | 2/10 | 1/9 | 1/7 | 1/6.5 | 0/9.5 | 2/11.5 | 2/13 | 3/11.5 | 3/11 | 1/10.5 | 4/10 | 0/6 |

\* Condensation product of 1 mol of p-tert.-nonylphenol and 9 mols of ethylene oxide
\*\*Product converted into hydroxy compound.

EXAMPLE 10

A pure polyester fabric is treated, in the manner indicated in Example 8, with a liquor which contains 690 g/l of the product according to Example 5, 120 g/l of di-trimethylolmelamine and 35 g/l of silicone oil emulsion (40 percent strength). The fabric is thereafter rinsed at 40°C, in the manner indicated in Example 9. The polyester fabric is then tested for its flameproof character according to the AATCC Test Method 34-1,909 (= glass filament test). Whilst untreated fabric burns away, the fabric which has been finished shows a burning time of zero seconds and a tear length of 13.5 cm.

EXAMPLE 11

Fabrics of polyester/cotton (PES/CO), 67:33 and 50:50, are padded with the liquors of Table 3 below and finished according to the ammonia fixing process, as follows:

The padded fabric is incompletely dried at 80°C, gassed with ammonia for 10 minutes, then padded in a liquor which contains 300 ml/l of a 24 percent strength aqueous ammonia solution and thereafter in a bath which contains 5 g/l of soap and 6 ml/l of $H_2O_2$ (35 percent strength), rinsed and dried.

The fabric is then washed for 5 minutes at 60°C in a liquor which per litre contains 5 ml of hydrogen peroxide (35 percent strength), 3 g of aqueous sodium hydroxide solution (30 percent strength) and 1 g of a 25 percent strength aqueous solution of a condensation product of 1 mol of p-tert.-nonylphenol and 9 mols of ethylene oxide. Thereafter the fabric is rinsed and dried.

The fabrics are then washed up to 20 times for 45 minutes at 60°C in a domestic washing machine, using a liquor which contains 4 g/l of a domestic detergent (SNV 198,861 wash). The individual fabric samples are then tested for their flameproof character (DIN 53,906 vertical test; ignition time 6 seconds).

The results are summarised in Table 3 below.

Table 3

| Constituents, g/l | Treated with | | | |
|---|---|---|---|---|
| | PES/CO 50:50 | | PES/CO 67:33 | |
| | A | B | C | B |
| Product according to Example 4 | 460 | 460 | 460 | 460 |
| Di-Trimethylolmelamine | 103 | | 103 | |
| Trimethylolmelamine-dimethyl-ether (75% strength) | | 153 | | 153 |
| Silicon oil emulsion (40% strength) | 35 | 35 | 35 | 35 |
| pH-Value of the Liquor | 5.5 | 5.5 | 5.5 | 5.5 |
| g of Phosphorus/kg of Fabric | 57 | 57 | 57 | 57 |
| Degree of Fixing, % | 76 | 75 | 76 | 71 |
| Flameproof Character: burning time (seconds) / tear length (cm) | | | | |
| After rinsing | 0/10.5 | 0/9 | 2/10.5 | 0/9.5 |
| After 1 wash | 0/6 | 0/7 | 2/10 | 3/10.5 |
| After 5 washes | 0/6.5 | 0/6.5 | 0/10.5 | 0/11.5 |
| After 20 washes | 0/6.5 | 0/6.5 | 2/10 | 1/10 |

What is claimed is:

1. A process for the manufacture of a water-soluble condensation product of a tetrakis-(hydroxymethyl)-phosphonium compound and a 1,3,5-triazine, consisting essentially of the step of condensing in the melt or in an aqueous medium 1 mol of a tetrakis-(hydroxymethyl)-phosphonium salt or hydroxide at 40° to 120°C with 0.02 to 0.1 mol of a 1,3,5-triazine of the formula

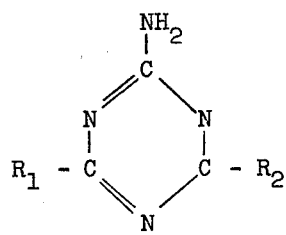

wherein
$R_1$ is amino, hydroxyl or hydrogen,
$R_2$ is amino, hydroxyl, hydrogen, methyl, phenyl or 1-dialkylphosphono-(alkyl)$_{n-1}$ wherein the moieties have 1 to 6 carbon atoms, and
$n$ is 1 or 2,
or with a methylolated 1,3,5-triazine of the above formula.

2. Process according to claim 1, characterised in that the condensation is carried out in the presence of at least one inert aromatic hydrocarbon as the solvent.

3. Process according to claim 1, characterised in that the two starting materials are condensed with one another in a molar ratio of 1:0.05 to 1:0.1.

4. Process according to claim 1, characterised in that a tetrakis-(hydroxymethyl)-phosphonium halide is used.

5. Process according to claim 1, characterised in that a compound of the formula

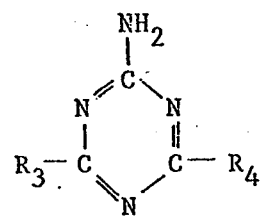

in used as the 1,3,5-triazine, wherein $R_3$ is amino or hydroxyl and $R_4$ is amino, hydroxyl, hydrogen or 1-diethylphosphonoethyl.

6. Process according to claim 1, characterised in that 1-diethylphosphonoethyl-1,3,5-triazine or melamine is used as the 1,3,5-triazine.

7. Process according to claim 1, wherein the condensation is effected in the presence of formaldehyde or a formaldehyde-releasing agent.

8. Process according to claim 1, wherein the condensation is thereafter continued at 100° to 150°C.

9. Process according to claim 1, wherein free hydroxyl groups in the product are thereafter etherified with an alkanol of 1 to 4 carbon atoms.

10. Process according to claim 1, characterized in that melamine is used as the 1,3,5-triazine.

* * * * *